Figure 1:
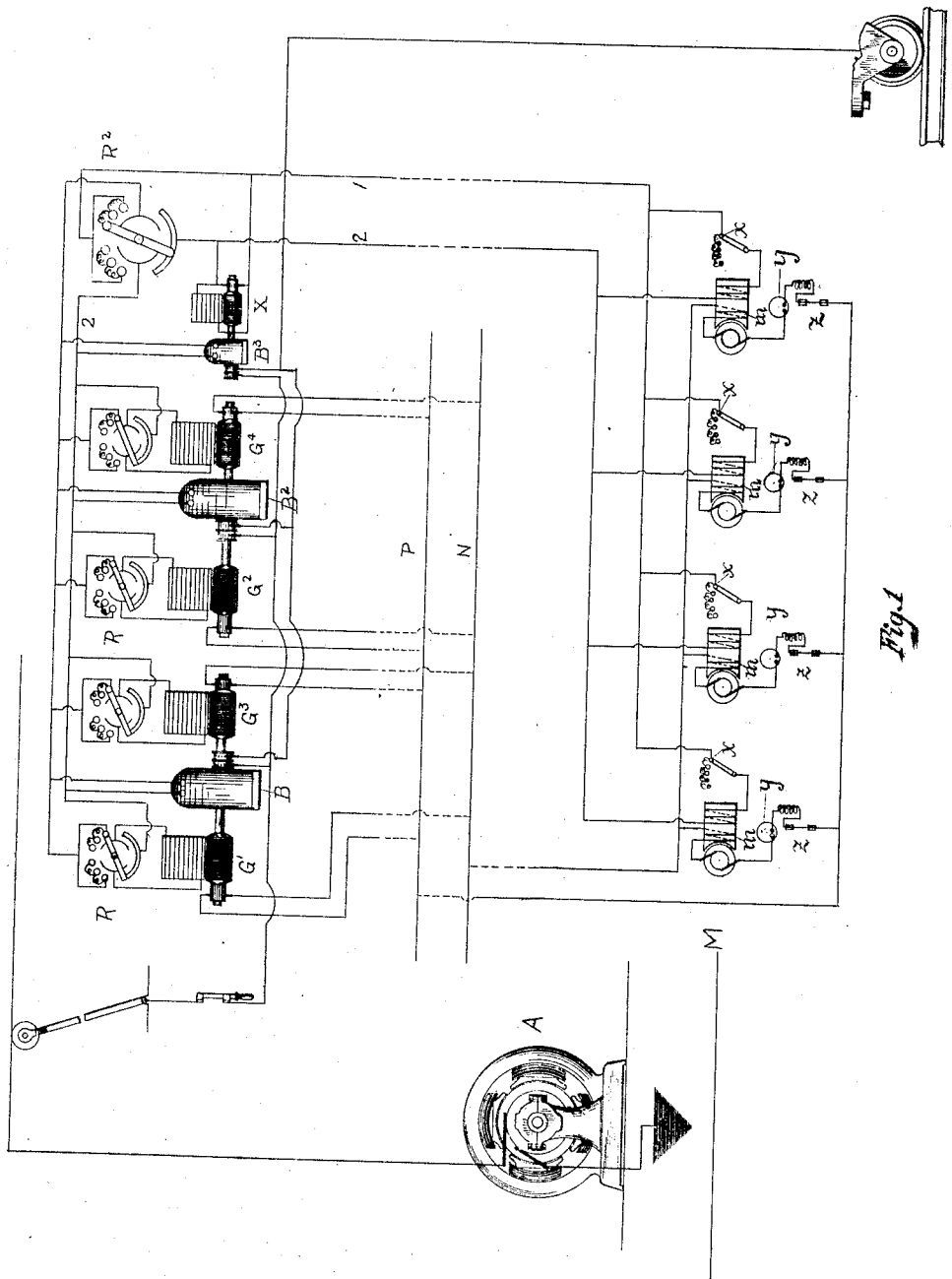

H. W. LEONARD.
ELECTRIC MOTOR CONTROL.
APPLICATION FILED APR. 24, 1903. RENEWED AUG. 16, 1904.

979,078.

Patented Dec. 20, 1910.
3 SHEETS—SHEET 2.

WITNESSES:
Hugo Boepple Jr.
Harvey C Ellis

INVENTOR
Harward Leonard
BY
ATTORNEY

UNITED STATES PATENT OFFICE.

HARRY WARD LEONARD, OF BRONXVILLE, NEW YORK.

ELECTRIC-MOTOR CONTROL.

979,078.

Specification of Letters Patent. Patented Dec. 20, 1910.

Application filed April 24, 1903, Serial No. 154,089. Renewed August 16, 1904. Serial No. 220,902.

*To all whom it may concern:*

Be it known that I, HARRY WARD LEONARD, a citizen of the United States, residing at Bronxville, in the county of Westchester, in the State of New York, have invented a new and useful Improvement in Electric-Motor Control, of which the follow is a specification.

My invention relates to the generation, transmission and utilization of electric energy, and the principal application of my invention is to the propulsion of vehicles by means of electric motors.

In electric locomotives suitable for hauling freight trains over the average existing road beds, the draw-bar pull will be perhaps six times as much, when developing the maximum torque necessary, as it is when the train is moving at full speed on a level.
A similar variation of torque is needed in a large automobile for moving freight for example. It is not important in such cases that the speed upon a grade should be maintained at any such speed as on a level, but it is important that there be ample torque to move the load under the worst conditions and that the acceleration should be as smooth as possible; that the method of control should be simple and reliable;
and that the maximum power required should be maintained as near as possible to the average power required. It is also important that the first cost of the necessary equipment should be as low as possible;
that the efficiency of the system should be made as high as possible; and that the depreciation of the apparatus by usage under practical conditions should be the least possible. These important requirements are rendered possible by the use of my invention to a degree not heretofore obtainable.

In order to make my invention clear I will point out that if such features as weight of load, maximum grade and maximum speed be fixed and other conditions be those of usual practice, then the required capacity in horse power of the motors is also fixed. The series parallel method of control for the propelling motors of electrically propelled vehicles is almost universally used at the present time, but there is no material saving in the capacity of the motors by the employment of that method of control, and in so far as the size, weight, cost, and horse power capacity of the motors is concerned, there is practically nothing directly gained by the operation of two or four motors in series-parallel combinations over the operation of a single motor, because each individual motor winding is subjected, when at full speed, to the full electromotive force, and when such a plurality of motors are operating at maximum torque each motor winding is subjected to the maximum current. The chief advantage of the series-parallel method of control is that it reduces the amount of energy taken from the source of supply by the motors when starting, accelerating or moving the load on heavy grades when the source of energy has a practically constant electromotive force, but it does not materially affect the weight or first cost of the motors required to produce the maximum speed and torque desired for a given load.

My invention involves principally the control and variation of a local source of energy rather than the arrangement of the propelling motors, whereby I obtain a large reduction in the first cost of the source of energy for the propelling motors. In one form of my invention for example I employ a local source of electric energy consisting of four dynamo electric generators which I group in multiple or in some equivalent way to obtain the joint effect of the currents upon the common load. When the maximum torque is required of the motors and when the maximum speed is required of the motors these generators are all connected in series.

As an illustration of one form of my invention I will describe the system as applied to an electric locomotive for hauling freight.

Figure 10:
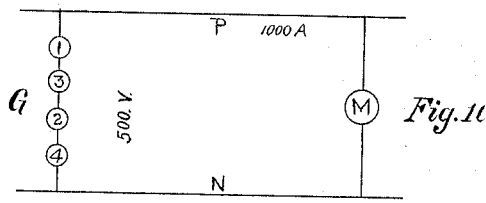
Figure 11:
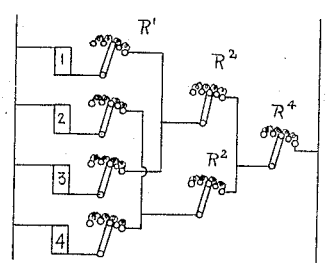
Figure 12:
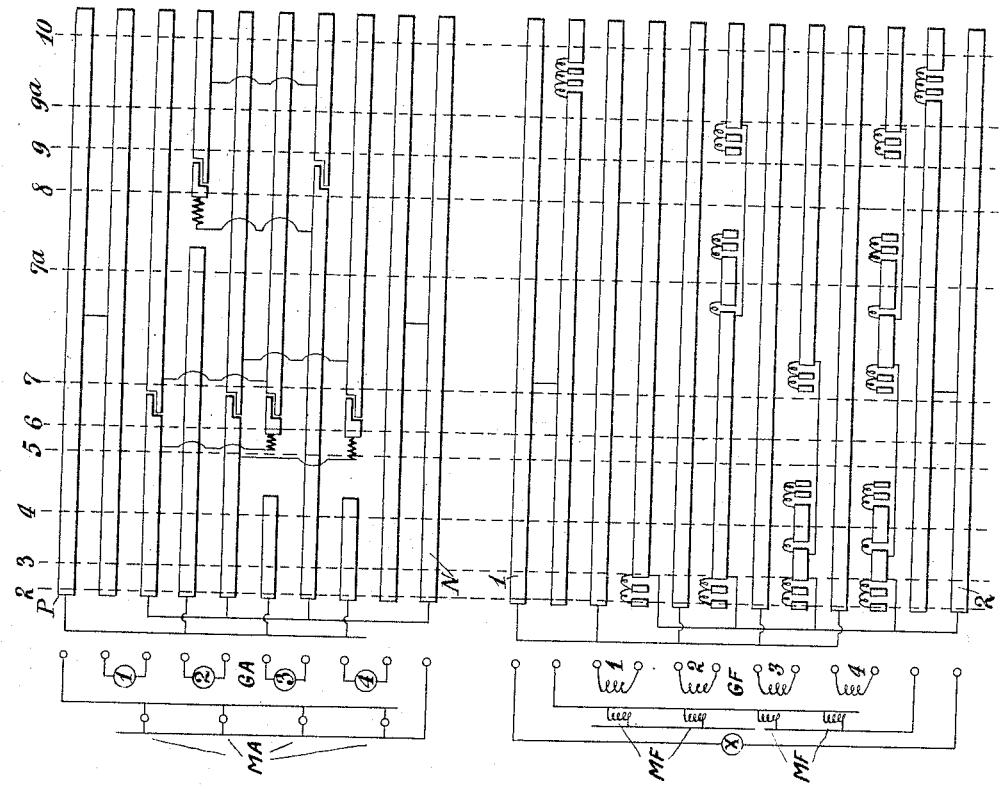

In the accompanying drawings Figure 1 is a diagram illustrating a main source of electric energy, a group of generators on the locomotive driven by electric motors operated by energy received from the main line, a group of propelling motors of which there may be any desired number and whose armatures are supplied by said generators, and an exciter set also operated by energy received from the main line and which is employed for exciting the fields of the generators and propelling motors, and the fields of the motors which drive the generators when alternating current motors are employed. Figs. 2–10 are diagrams illustrating the various connections of the generator armatures under certain assumed conditions of operation. Fig. 11 is a diagram of a modified arrangement of controllers for the generator fields, and Fig. 12 is a diagram of a controller of the drum type for effecting the various connections.

The original source of power may be a water fall which power by means of turbines or equivalent apparatus drives one or more electric generators A which, for instance, generate electric energy in the form of a single phase alternating current. This current is either produced at a high electromotive force or it is transformed by static transformers to a high electromotive force current suitable for long distance power transmission, the electromotive force being preferably not less than 200 volts per mile. In usual practice 15000 volts and upward will give good results. This high electromotive force current will be led upon the locomotive through moving contacts and passes in multiple through one or more single phase alternating current motors. The high electromotive force transmission circuit may be either a single conductor with a ground return or it may be a complete metallic circuit, and static transformers can be employed to transform this energy so that the electromotive force in the secondary working circuit may be lower. The single phase alternating current motors will drive four continuous current generators at a practically constant speed. Sometimes it will be more advantageous to have two alternating current motors B and B² each driving two of the four continuous current generators G¹ G² G³ and G⁴. In addition to these motors and generators I employ preferably a small self starting single phase alternating current motor B³ for driving a continuous current generator X of constant electromotive force. This generator is employed for exciting the fields of the direct current generators, the fields of the alternating current motors, and the fields of the direct current propelling motors.

The field circuits of generators G are connected in parallel in a circuit 1—2 from the exciter X. Each direct current generator G is provided with a reversing rheostat R in its field circuit so that the electromotive force of each generator, when desired, may be independently varied by the operator from zero to its maximum volts in either sense. In the circuit 1—2 from the exciter to the field circuits of the generators I provide a large reversing rheostat R² whereby the fields of all the generators G may be varied similarly and simultaneously. The armatures of the generators are connected to a circuit P—N through a suitable controller (shown in Fig. 12) whereby they may be connected in working groups as follows: four in parallel; two in series in two parallel groups; or all in series, and in proper intermediate groups to effect the proper shift from one working group to another.

Preferably the field circuits of the propelling motors M are connected in parallel across circuit 1—2 from the exciter X and each motor field circuit is provided with a rheostat $x$ whereby the fields of the motors may be adjusted relatively to each other so as to divide the load equally. The armatures of the motors M are preferably connected in parallel across circuit P—N and each armature preferably has connected in series with it an ampere indicator $y$ and an automatic circuit breaker $z$. While in some instances the rheostats in the field circuit of the motors may be sufficient to adjust the fields relatively to each other to cause them to divide the load equally, it is desirable to provide some means for equalizing the characteristics of each field magnet, and for this purpose I provide each motor field magnet with a compensating coil $m$ which is illustrated in Fig. 1 as a series coil in series with the armature winding.

To explain the operating conditions let it be assumed that each generator armature is wound to produce 125 volts and 1000 amperes so that when connected in multiple the combined output is 4,000 amperes at any voltage up to 125 volts and that when all the generator armatures are connected in series they will produce 1000 amperes at 500 volts. The armatures of motors M will be wound for 500 volts, and in order to secure good results as regards size and weight of each motor and as regards the distribution of weight on drivers, it will be assumed that 16 propelling motors M are employed on the locomotive, each motor being geared or directly coupled to a driving wheel. For simplicity of illustration only four motors are shown in Fig. 1, and the driving connections are omitted. The total ampere capacity of the motor windings would be 4000 amperes, so that each of the 16 motors would have its armature wound for 500 volts and 250 amperes, i. e., 125 kilowatts. It will be noted that the combined kilowatt capacity of the motor windings is 2000 kilowatts, while the combined kilowatt capacity of the generator windings is only 500 kilowatts. It will also be assumed that the kilowatt capacity of the alternating current motor windings is also 500 kilowatts, the small amounts of energy lost in excitation and conversion being disregarded for the purpose of this description, since such losses do not materially affect the figures or the argument. Now let it be assumed that the locomotive and its train is at rest; that the circuit to the alternating current motors is closed and that said motors are running on friction load; that the exciter set is also running; that the field circuits of generators G are closed at rheostats R and R² but open at the controller shown in Fig. 12; that the controller of Fig. 12 is then moved one step forward from the neutral position, whereupon the circuit to the field windings of the generators will be closed through resistances and connected in multiple across contacts 1—2 of the controller of Fig. 12; the armatures of the generators connected in multiple arc relation with each other across contacts P—N of the controller, the armatures of the propelling motors connected in multiple arc relation with each other across said contacts P—N, and the field circuits of said motors also closed and the fields fully excited.

Figure 2:
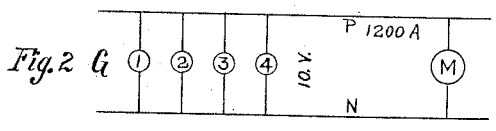
Figure 3:
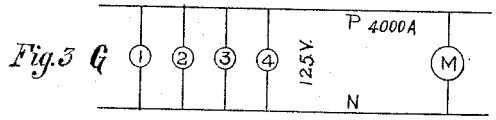
Figure 4:
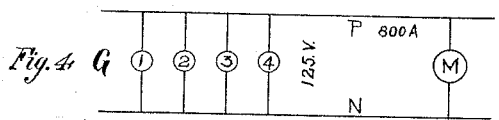
Figure 5:
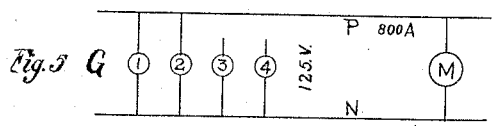
Figure 6:
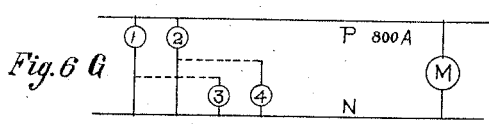
Figure 7:
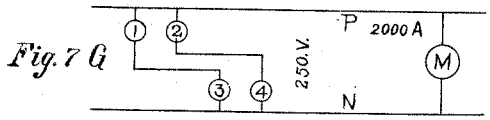
Figure 8:
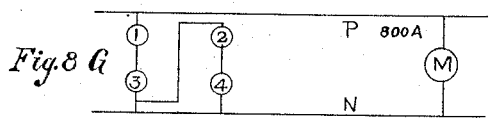
Figure 9:
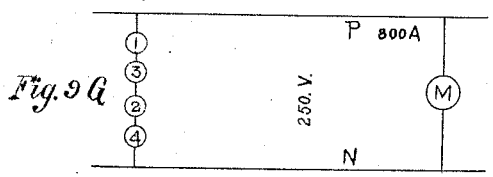

In Fig. 12, G A are the four generator armatures, marked 1, 2, 3, and 4, which correspond, respectively, to machines $G^1$, $G^2$, $G^3$ and $G^4$ of Fig. 1; G F are the field coils of said generators, numbered to correspond with the armatures; M A indicate the propelling motor armatures and M F the field coils thereof; X represents the exciter; P N the armature leads and 1—2 the leads to the field circuits. The fields of the generators are now simultaneously and similarly excited by continuing the forward movement of the controller so that each generator armature will produce an electromotive force gradually rising from zero, the electromotive forces of the four armatures being continually equal. Since the propelling motor armatures are connected in multiple across the generator circuit, it is evident that a very low electromotive force will suffice to send through said motor armatures in the presence of fully excited fields a current sufficient to cause said motor armatures to start the load. Now let it be assumed that the current needed to overcome friction and maintain the load in motion on a level track, at a uniform speed, is 1000 amperes in motor fields which have been weakened somewhat. Let it be assumed that this torque would correspond to about 800 amperes in motor fields of full strength; that is that 800 amperes through the armatures in the presence of fully excited motor fields would produce the torque required to maintain the train in motion at a constant speed on a level track. With 4000 amperes through the motor armatures in multiple there can be produced a torque five times as much as that needed on a level. If it be assumed that the rolling friction on a level is 6 lbs. per ton of 2000 lbs. we will have an equivalent of a 0.3 per cent. grade, and since 4000 amperes will be five times as much torque as is required to maintain the train in motion on a level, it follows that there can be produced a torque sufficient to overcome this resistance and move the load continually on a grade of say 1.2 per cent. For short periods we can readily operate at 5000 amperes, without danger, armatures which will carry 4000 amperes continuously so that we can produce a torque sufficient to move the load for about one hour or two on a grade of say 1.6 per cent. Returning now to a consideration of the train at rest on a level, it will be seen that as the electromotive force between conductors P and N is gradually increased from zero, a current is soon caused to pass through the motor armatures sufficient to overcome the friction of rest and start the train. If it is assumed that in fully excited motor fields an increase of 50 per cent. in the running torque will start the load, then 1200 amperes will start the load. This 1200 amperes will be produced by a very low voltage, say 10 volts, so that the load can be started in motion with about 12 kilowatts taken from the source (Fig. 2 and position 2 Fig. 12). In order to accelerate as rapidly as possible without overheating the armatures, the generator field excitation will be increased at such a rate as to maintain 4000 amperes flowing until the full electromotive force of the generators is reached, at which time the generators will be producing 4000 amperes at 125 volts, or 500 kilowatts (Fig. 3 and position 3 Fig. 12). It will be noted that if the electromotive force is maintained constant at 125 volts after having accelerated to that voltage, the current will rapidly drop until when there is no further acceleration and the train is moving on the level track, the current will be 800 amperes (Fig. 4) which is the current needed in full fields to balance the torque of the friction and slight air resistance at the speeds of usual freight trains. It will also be noted that the speed on the level at 125 volts is one-fifth of the speed on the level with 500 volts and the motors operating with weakened fields. The energy at one-fifth speed on the level will be 125 volts×800 amperes=100 kilowatts. The fields of generators $G^3$ and $G^4$ are now slightly weakened until the current they produce is zero and the entire 800 amperes is produced by the other two generator armatures in multiple (position 4 Fig. 12). I then disconnect from conductor P the two armatures which are generating no current (Fig. 5 and position 5 Fig. 12) and reduce their fields to zero so that those two machines generate no electromotive force; then while keeping these inert armatures in multiple with each other I connect the disconnected armature terminals (through resistances) to the conductors connecting armatures $G^1$ and $G^2$ with conductor N (Fig. 6 and position 6 Fig. 12) and then those two armatures are disconnected from conductor N so that said two armatures will be connected in series with armatures $G^3$ and $G^4$, respectively, across the circuit (Fig. 7 and position 7 Fig. 12). I then gradually build up the fields of generators $G^3$ and $G^4$ simultaneously and similarly.

It will be noted that the electromotive force of the generators can be increased at a rate such as will give 2000 amperes for accelerating the load on the level until finally they are producing 2000 amperes at 250 volts or 500 kilowatts which is the maximum energy while the generator armatures are connected in multiple series as just described. If the 250 volts are maintained the current will again rapidly fall to the 800 amperes required for maintaining the train at the desired speed on the level after acceleration. Next I weaken slightly the fields of generators $G^2$ and $G^4$, the armatures of which are in series with each other, until that pair of generators produces no current and the other pair of generator armatures in series produce the entire 800 amperes at 250 volts (position 7$^a$ Fig. 12) I then disconnect from the circuit these two inert armatures by disconnecting the armature of $G^2$ from conductor P and then open the field circuits of those two machines so that they generate no volts; then while keeping the armatures of these two generators connected in series with each other I connect the disconnected armature terminal to the conductor connecting armature of $G^3$ with conductor N (Fig. 8 and position 8 Fig. 12) and then open conductor N between the outside terminals of machines $G^4$ and $G^4$ so that the four generator armatures (Fig. 9 and position 9 Fig. 12) will now be connected in series across the circuit, the first two generating 125 volts each and the last two carrying the 800 amperes but generating no volts. Next I gradually raise the fields of generators $G^2$ and $G^4$ while maintaining the current at 1000 amperes until finally the armatures are producing 1000 amperes at 500 volts (position 9$^a$ Fig. 12). The current now begins to fall again toward 800 amperes and by gradually weakening the motor fields similarly and simultaneously while maintaining the current at 1000 amperes full speed on the level is reached, the watts being now 500 volts$\times$1000 amperes=500 kilowatts (Fig. 10 and position 10 Fig. 12).

It will be noted that the energy consumed at full speed is the maximum energy required at any time, which is 500 kilowatts, and that at no time during the period of acceleration does the energy exceed that amount.

To reduce the speed of the train and to secure increased torque with corresponding reduction in speed when needed to meet operative conditions without exceeding the maximum of 500 K. W., the controller can be moved backward, passing over the various positions already described, and securing the required amperes and volts in the reverse order. Although I have referred generally to a maximum output of 500 K. W. in the particular case assumed, it is well known that the dynamo electric machines, such as the generators and motors described, can be subjected without injurious results, for the comparatively brief intervals represented by the time when the locomotive will be ascending a grade, to currents which will be very largely in excess of those which the apparatus would stand for continuous duty. In many cases, it will be desirable to take advantage of this temporary capacity for excessive overload and to operate the machines at powers greatly in excess of their normal rating. In other words, the importance of maintaining a constant horse power will often times be secondary to maintaining as high a speed as can be maintained without damaging the machines by the overload current, as one of the most important things affecting an economy of operation of a railway will be to prevent any congestion of trains at any portion of the railway.

To stop from full or partial forward speed, the controller by which the various connections are obtained, is turned backward toward the position of rest. That is, if the motors are driving the load forward at full speed, the controller is turned backward (from position 10 Fig. 12) thereby first strengthening the field of all the motors and then weakening the fields of two of the armatures in series; then short circuiting those armatures; then building up the fields of those armatures until their electro-motive forces balance the counter volts of the motors; then these armatures are connected in multiple with the other two armatures, then they are caused to assume one-half of the load between them; then the fields of two armatures are again weakened until they are zero; then they are short circuited and disconnected; then the fields of this pair of armatures are built up together until they again balance the motor counter volts; then they are connected in multiple with the other two armatures, the four armatures being now in multiple; then the fields are varied until the four armatures are dividing the load at 125 volts, and then the voltage of the group of armatures is reduced to zero when the train will be at rest. During the operation of reducing the speed from full speed to rest, the energy of the moving load is being transformed and fed back into the line in the form of useful electric energy. To start and accelerate in the opposite direction the field connections of the generators are closed in the reverse direction by controller R, and built up, and then the armatures and fields are manipulated as before.

In practice I connect in series with each generator armature a circuit breaker which will open the circuit of its armature whenever the current through it exceeds a predetermined maximum.

In some instances I may employ a series of controlling rheostats for the generator fields as shown in Fig. 11. By this arrangement the fields may be controlled individually or in groups, as follows: R⁴ is a master controller which controls the four fields simultaneously and similarly; R² controls fields 1—3 and 2—4 in pairs, and R¹ controls individual fields. It will be understood that while these controllers for simplicity are shown nonreversing, in practice reversing rheostats would be employed.

Instead of embodying the propelling motors in a locomotive as above stated, they may be distributed throughout the cars of a train, any number of which may be motor cars, the motors being suspended upon the trucks in the usual manner. With such an arrangement the local generators may be carried by a car usually at the head of the train and in which car the controllers and other apparatus will also be located.

Instead of driving the local generators G¹—G⁴ by alternating current motors operated by current from a main source of electric energy, I may employ gasolene engines or their equivalent for driving these generators. In such case I prefer to employ two gasolene engines each driving two generators, and I also prefer to mechanically couple the engine shafts by a clutch, or other suitable means, so that they may be operated together, or independently. By equipping several cars in a train, each having two gasolene engines and four generators, I can operate such a train by the multiple unit method of control. Single cylinder engines coupled together give as good results as double cylinder engines, and by employing two double cylinder engines coupled together I can obtain the same effects as are obtainable with one four cylinder engine.

Although I have described and illustrated certain embodiments of my invention, it will be understood that various modifications may be made in the character of the apparatus and arrangement and connections thereof, without departing from the terms and scope of the appended claims.

What I claim is:

1. The method of varying the speed of an electrically driven device, which consists in arranging in different operative relationship to each other two electromotive force producing windings which are electrically connected with the counter electromotive force producing windings of a plurality of driving motors, and varying the electromotive force of one or both of said first-named windings and thereby supplying the joint energy of the two windings at different voltages to the said motor windings.

2. The combination of a plurality of independent sources of electromotive force, the electromotive force of each source being independently variable and reversible, and means for connecting the said sources in series or in parallel with each other.

3. The combination of a plurality of electric motors, a source of electric energy composed of a plurality of electromotive force producing windings supplying energy to at least one element of each of said motors, and means for coupling said windings in series and otherwise with reference to said motors and for varying the electromotive force of the energy supplied by at least one of said windings for the purpose of varying the speed of the motors.

4. The combination of an electric motor, a plurality of independent sources of unidirectional electric energy, means for varying the electromotive force of each of said sources of energy between certain limits, and means for coupling said sources in series or in parallel for the purpose of controlling the said motor.

5. The combination of four dynamo electric machines each having a separately excited field, an electric motor connected therewith, and means for connecting the armatures of the four dynamos in multiple, in multiple-series, and in series with each other for the purpose of varying the speed and torque of the electric motor.

6. The combination of a source of alternating current energy, rotary converting devices for converting the alternating current energy into four independent sources of unidirectional energy, means for varying the electro-motive force of said four sources of energy, and means for combining the said four sources in multiple, multiple-series, and series relation for the purpose of controlling the electromotive force and current supplied to an electric motor.

7. The combination of an electric motor, four dynamo electric generators, and means for coupling the armatures and regulating the fields of said generators so that any desired electromotive force up to the sum of the electromotive forces of the four generator armatures can be progressively supplied to the armature of the motor for the purpose of varying its speed, and so that any current up to the combined currents of the four generator armatures in multiple can be supplied to the motor for the purpose of varying its torque.

8. The combination of a plurality of sources of electromotive force and a translating device, means for coupling said sources in multiple to secure maximum amperes, means for coupling said sources in series to secure maximum electromotive force, and means for varying the electromotive force of the combined sources of energy so as to secure a gradual increase of electromotive force from the lowest electromotive force desired to the maximum electromotive force desired upon the terminals of said translating device.

9. The combination of a plurality of sources of electromotive force and a translating device, means for coupling said sources in multiple to secure maximum amperes, means for coupling said sources in series to secure maximum electromotive force, means for varying the electromotive force of the combined sources of energy so as to secure a gradual increase of electromotive force from the lowest electromotive force desired to the maximum electromotive force desired upon the terminals of said translating device, and means for reversing the electromotive force upon the said terminals.

10. The combination of a plurality of dynamo electric generators and an electric motor supplied thereby, means for connecting said generators in multiple for supplying maximum current to the armature of said motor, means for coupling said generators in series for supplying maximum electromotive force to said motor armature, and means for producing gradual increments in the speed of said motor from rest to full speed.

11. The combination of a plurality of dynamo electric generators and an electric motor supplied thereby, means for connecting said generators in multiple for supplying maximum current to the armature of said motor, means for coupling said generators in series for supplying maximum electromotive force to said armature, means for weakening said motor field for the purpose of increasing its speed, and means for producing gradual increments in the speed of said motor from rest to full speed.

12. The combination of a plurality of dynamo electric generators and an electric motor supplied thereby, means for connecting said generators in multiple for supplying maximum current to the armature of said motor, means for coupling said generators in series for supplying maximum electromotive force to said motor armature, means for producing gradual increments in the speed of said motor from rest to full speed, and means for reversing the direction of rotation of said motor.

13. The combination of a plurality of dynamo electric generators and an electric motor supplied thereby, means for connecting said generators in multiple for supplying maximum current to the armature of said motor, means for coupling said generators in series for supplying maximum electromotive force to said motor armature, means for weakening said motor field for increasing its speed, means for producing gradual increments in the speed of said motor from rest to full speed, and means for reversing the direction of rotation of said motor.

14. The combination of a source of electromotive force, a translating device operated therefrom, transformers of electric energy between said source and said translating device, and means for connecting certain windings of said transformers in multiple and in series and for varying the electromotive force supplied by at least one of said transformers.

15. The combination of a source of electromotive force, an electric motor operated therefrom, transformers of electric energy between said source and said motor, means for connecting certain windings of said transformers in multiple and in series, and means for reversing the electromotive force delivered by said transformers.

16. The combination of a source of electromotive force, a translating device operated therefrom, means between said source and said translating device for transforming electric energy from said source and delivering the same to said device, said means comprising a plurality of windings, and means for coupling said windings in parallel and in series and for varying the electromotive force supplied by at least one of said windings for varying the electromotive force delivered to said translating device.

17. The combination of a source of electromotive force, an electric motor operated therefrom, means between said source and said motor for transforming electric energy from said source and delivering the same to said motor, said means comprising a plurality of windings, and means for coupling said windings in parallel and in series with reference to said motor and for varying the electromotive force of the energy supplied by at least one of said windings for varying and reversing the electromotive force delivered to said motor.

18. The combination of a plurality of sources of magnetically induced electromotive force, means for controlling the electromotive force generated by each of said sources and for independently varying the magnetic field of at least one of said sources, means for connecting said sources in series and in parallel, and a translating device supplied thereby.

19. The combination of a plurality of sources of magnetically induced electromotive force, a translating device, and controlling means for said sources for producing upon the terminals of said translating device in either sense as regards polarity any desired electromotive force up to the sum of the electromotive forces of said sources.

20. The combination of a plurality of sources of electromotive force, a translating device, and controlling means for said sources for producing upon the terminals of said translating device any desired electromotive force up to the sum of the electromotive forces of said sources and for delivering to said translating device any desired current up to the sum of the current of said sources without the use of controlling resistances in series with said device and without subjecting said device to any sudden change in the current through or electromotive force upon said device.

21. The combination of a plurality of sources of electromotive force, each of said sources producing its electromotive force independently of the others, a translating device, and controlling means for said sources for producing upon the terminals of said translating device any desired electromotive force up to the sum of the electromotive forces of said sources and for reversing the electromotive force upon the terminals of said translating device without reversing its circuit connections.

22. The combination of a plurality of sources of electromotive force, each of said sources producing its electromotive force independently of the others, a translating device, and controlling means for said sources for producing upon the terminals of said translating device any desired electromotive force up to the sum of the electromotive forces of said sources and for delivering to said translating device any desired current up to the sum of the currents of said sources, and also for reversing the electromotive force upon the terminals of said translating device without reversing its circuit connections.

23. The combination of four dynamo electric generators, and controlling means for so combining the said sources as to place them first all four in multiple, next two in multiple and two in series, and then all four in series, and means for passing from one connection to the next without materially affecting the electromotive force delivered.

24. The combination of a plurality of electromotive force producing windings, a translating device, and means for connecting said windings in parallel and in series and for varying the electromotive force supplied by at least one of said windings for producing upon the terminals of said translating device a gradually increasing electromotive force up to the sum of the electromotive forces of said windings.

25. The combination of a plurality of dynamo electric generators, and means for coupling the armatures of said generators in parallel for producing the sum of the currents of said armatures at any desired electromotive force, and for coupling the armatures of said generators in series without materially affecting the electromotive force delivered and for controlling the electromotive force of said armatures while in series.

26. The combination of an electric motor, means for generating by magnetic induction an electromotive force in series with at least one element of the motor, and a controlling means by the progressive movement of which the said electromotive force generated is varied so as to vary the speed of the motor within certain limits and by which the other element of the motor is affected to still further vary the speed of said motor.

27. The combination of a vehicle and an electric motor for propelling the same, a plurality of electromotive force producing windings and means for producing independent fields for said windings carried upon said vehicle, means for connecting the said windings in parallel and in series for the purpose of controlling said motor, and means for independently controlling the electromotive forces produced by said windings.

28. The combination of a plurality of electromotive force producing windings, a plurality of motors operated therefrom upon a common load, means for varying the circuit connections of said windings relative to the motors, whereby the torque and speed of said motors can be varied, and means for independently controlling the electromotive forces produced by said windings.

29. The combination of a stationary alternating current source, a vehicle operated therefrom, a plurality of transformers of electric energy carried by the said vehicle, and means for coupling certain windings of said transformers in parallel and in series for controlling the movement of said vehicle.

30. The combination of a vehicle, a plurality of dynamo electric generators carried thereby, each having its own independent armature and field, and means for coupling the armatures of said generators in series and in parallel for the purpose of controlling the movement of the vehicle.

31. The combination with a dynamo electric machine, of means for varying the excitation of its field from a low to a high excitation under the working conditions of said machine, the said field being excited partially by a winding in series with its armature and partially by a separately excited winding, the said two windings being wound in a direction to aid each other in the excitation of the field.

32. The combination of a plurality of sources of electromotive force, means for varying the electromotive force of each of said sources, a translating device, and means for connecting the said sources in series and in parallel with each other to supply said translating device.

33. The combination of a source of electromotive force, an electric motor operated therefrom, transformers of electric energy between said source and said motor, means for connecting certain windings of said transformers in multiple and in series, and means for reversing the motor.

34. The combination of a source of electromotive force, an electric motor operated therefrom, means between said source and said motor for transforming the electric energy from said source and delivering the same to said motor, said means comprising a plurality of windings, and means for coupling said windings in parallel and in series with reference to said motor, and for varying the electromotive force of the energy supplied by at least one of said windings for varying and reversing the electromotive force applied to the motor.

35. The combination of a plurality of sources of electromotive force, an electric motor, and controlling means for said sources for producing upon the terminals of said motor any desired electromotive force up to the sum of the electromotive forces of said sources and for delivering to the said motor any desired current up to the sum of said sources, and means for reversing the motor.

36. The combination of two electromotive force producing windings and a supply circuit, means for coupling said windings in parallel with each other and for coupling said windings in series without materially affecting the electromotive force delivered to said circuit.

37. The combination of two electromotive force producing windings and a supply circuit, means for coupling said windings in parallel with each other and for coupling said windings in series without materially affecting the electromotive force of said circuit, and means for varying the combined electromotive force of the windings when in multiple and when in series.

38. The combination of two electromotive force producing windings and a supply circuit, a motor connected to said circuit, means for coupling said windings in parallel with each other and in series without materially affecting the electromotive force delivered to said circuit, and means for varying the combined electromotive force of the windings when in multiple and when in series for varying the electromotive force of the circuit and thereby the speed of the motor.

39. In an electric railway system, the combination of a stationary source of high tension electric energy, a vehicle, a propelling electric motor, a plurality of electromotive force producing windings affecting at least one element of the motor, and means for coupling said windings in series and in parallel with reference to said motor.

40. In an electric railway system, the combination of a stationary source of high tension alternating current energy, a vehicle, means for leading the current upon the vehicle through moving contacts, a propelling electric motor, a plurality of electromotive force producing windings affecting at least one element of the motor, and means for coupling said windings in series and in parallel with reference to said motor.

41. The combination of a plurality of electromotive force producing windings, a supply circuit, and a controlling device by the progressive movement of which the electromotive force of said windings is gradually increased, the connection then changed from parallel to series and the electromotive force again increased when connected in series.

42. The combination of a plurality of electromotive force producing windings, a supply circuit, and a controlling device by the progressive movement of which the said windings are first connected in parallel, their electromotive forces then increased, the electromotive force of certain of the windings decreased and then connected in series with certain of the other windings, and the combined electromotive force increased.

43. The method of varying the electromotive force delivered to a circuit which consists in generating a current, transforming by magnetic induction the energy represented by said current into two separate sources of energy, coupling said two sources in parallel and in series for the purpose of varying the electromotive force, and varying the electromotive force of one of said sources relatively to that of the other.

44. The method of operating a railway which consists in generating alternating current, leading the alternating current energy represented thereby upon the moving vehicle, deriving therefrom two sources of electromotive force, and supplying a propelling motor from said sources when joined in parallel and in series.

45. The method of varying the electromotive force delivered to a circuit which consists in producing two electromotive forces, coupling them in multiple, varying their joint electromotive force, coupling them in series and then varying their joint electromotive force.

46. The method of controlling the electromotive force delivered to a circuit which consists in producing two electromotive forces, coupling them in parallel and simultaneously increasing their electromotive forces, coupling them in series, and independently varying one of the electromotive forces.

47. The method of controlling an electric motor which consists in developing by magnetic induction two electromotive forces, coupling the sources of electromotive force in parallel and in series, and varying at least one of said electromotive forces for varying the electromotive force applied to at least one element of the motor.

48. The method of controlling an electric motor which consists in supplying the motor with energy from two sources of electromotive force, and reversing the motor by simultaneously reversing the electromotive forces of said sources.

49. The method of varying the electromotive force delivered to a circuit which consists in coupling two sources of electromotive force in parallel to produce a maximum current, coupling them in series to produce their maximum electromotive force, and reversing their electromotive forces to reverse the electromotive force of the circuit.

50. The method of controlling a motor which consists in supplying the field of the motor with current from one source, supplying the armature from two sources of electromotive force coupled in parallel under certain conditions and coupled in series under other conditions.

51. The method of operating an electric motor which consists in supplying at least one element of the motor from a plurality of sources of electromotive force in parallel, increasing the electromotive force of said sources to increase the speed of the motor, developing in series with at least one of said sources and the motor an electromotive force in the same sense and at a reduced value by one of said sources, and increasing said latter electromotive force to still further increase the speed of the motor.

52. The method of operating an electric motor which consists in supplying it with energy from two sources of electromotive force, coupling said sources in parallel under certain conditions and in series under certain other conditions, and independently varying the field strength of the motor under other conditions.

53. The method of controlling an electric motor which consists in generating alternating current energy, deriving therefrom two sources of electromotive force, supplying at least one element of the motor with energy represented by the joint action of said sources and supplying another element of the motor with energy other than that supplying said first named element.

54. The combination of an electric motor, means for generating by magnetic induction an electromotive force in series with at least one element of the motor, and a controlling means by the progressive movement of which the said electromotive force generated is varied so as to vary the speed of the motor within certain limits and by which the other element of the motor is affected to still further vary the speed of said motor, and means for reversing the said electromotive force generated.

55. The combination of a plurality of electric generators, means for separately exciting the field of each of said generators, adjustable means for individually varying the field excitation of said generators, and a master controller for simultaneously varying the field excitation of all of said generators.

56. The combination of a plurality of electric generators, means for separately exciting the field of each of said generators, adjustable means for individually varying the field excitation of said generators, and a master controller for simultaneously varying and reversing the field excitation of all of said generators.

57. The combination of a plurality of electric motors, a plurality of transformer windings adapted to receive alternating current energy and supply current to said motors, and means for connecting certain of said windings in series with reference to said motors and for varying the electromotive force of the energy supplied by at least one of said windings.

58. The method of operating a railway vehicle which consists in generating electric energy at a stationary source, transmitting electric energy at relatively high electromotive force, conducting electric energy upon the vehicle through moving contacts, transforming the energy upon the vehicle into a plurality of divisions and of lower electromotive force, supplying electric energy to the propelling motors representing the aggregate current capacity of said divisions, varying the electromotive force of the energy while the divisions are in said relation, supplying electric energy to the motors while said divisions are in series relation, and varying the electromotive force of the energy while the divisions are in series relation.

59. The combination of a plurality of electric motors operating upon a common load, each of said motors having two field windings, one of said windings being in series with the motor armature and the other of said windings being separately excited.

60. The combination of a plurality of electric motors, a vehicle propelled by said motors working in unison, each of said motors having two field windings, one of said windings being in series with the armature and the other of said windings being separately excited, the direction of winding being such that said two windings aid each other in exciting the field of its motor.

61. The combination of a plurality of sources of electromotive force, a plurality of motors acting on a common load and supplied with energy from said sources, a controller for varying the connections of said sources with reference to said motors for varying the electromotive force supplied to the motors and for varying the field strength of the motors.

62. A system of motor control, comprising a motor, two independent sources of current supplying the motor field and armature respectively, and a controller operated by a single handle arranged to vary inversely the resistance of the motor field circuit and the electromotive force of the armature supplying current source.

63. A system of motor control, comprising a motor, a generator supplying the motor armature, an independent generator supplying the field circuits of the generator and the motor, and means for inversely varying the resistances of said field circuits.

64. A system of motor control, comprising a generator, a motor supplied thereby, separate variable resistances for the field circuits of the generator and the motor, and a single controller arranged to increase the motor speed by first cutting all of one of the resistances out of the generator field circuit, and then cutting all of the other resistance into the motor field circuit.

65. A system of motor control, comprising a generator, a motor supplied thereby, separate variable resistances for the field circuits of the generator and the motor, and a single controller arranged to vary said resistances successively and inversely.

66. A system of motor control, comprising a generator, a motor supplied thereby, separate variable resistances for the field circuits of said generator and motor, and a single controller arranged to vary either of said resistances when the other resistance is fully cut out.

67. A system of motor control, comprising a generator, a motor supplied thereby, separate variable resistances for the field circuits of the generator and the motor, and a single controller arranged to vary the motor speed by first gradually cutting out all of one resistance from its circuit and then gradually cutting all of the other resistance into its circuit.

68. A system of motor control, comprising a generator, a motor supplied thereby, separate variable resistances for the field circuits of the generator and the motor, and a single controller arranged to vary said resistances successively and inversely, each resistance being varied only when the other resistance is fully cut out.

69. A system of motor control, comprising a generator, a motor supplied thereby, and a single controller so connected and arranged that as its arm is moved from "off" position, the generator field circuit is first closed, and the resistance of said circuit gradually decreased to a minimum and then the resistance of the motor field circuit gradually increased to a maximum.

70. A system of motor control, comprising a motor having main and auxiliary field windings, a generator for supplying the armature of said motor, a separate source of current for supplying one of the field windings of the motor, and a single means for varying the field strengths of the generator and the motor.

71. A system of motor control, comprising a motor having main and auxiliary windings, a generator for supplying the armature of said motor, a separate source of current for supplying one of the field windings of the motor, and a single means for varying the field strengths of the generator and the motor inversely.

72. A system of motor control comprising a motor having main and auxiliary field windings, a generator for supplying the armature and auxiliary field winding of the motor, a separate source of current for supplying the main field winding of the motor, and means for varying and reversing the electromotive force of the generator.

73. A system of motor control, comprising a motor having main and auxiliary field windings, a generator for supplying the armature and auxiliary field winding of the motor, a separate source of current for supplying the main field winding of the motor, and means for varying and reversing the field of the generator.

74. A motor control system comprising a motor, a plurality of generators supplying the armature of said motor, a common source of electromotive force supplying the field windings of said generators, and means for varying the relative current strengths in the field windings of said generators.

75. A system of motor control comprising a motor, a plurality of generators supplying the armature of said motor, a common source of electromotive force supplying the field windings of said generators, and means for varying the field strengths of said generators both individually and collectively.

76. The method of regulating the speed of an electric motor which consists in conducting current to the armature of said motor from one source of current, supplying its field jointly from said source of current and another source of current, and varying the electromotive forces supplied by said two sources of current.

77. The method of regulating the speed of an electric motor which consists in energizing the armature of said motor from one source of current, energizing its field jointly from said source of current and another source of current, and varying the electromotive forces supplied by said two forces of current inversely.

78. The method of regulating the speed of an electric motor which consists in energizing the armature of said motor from one source of current, energizing its field jointly from said source of current and another source of current, and varying the electromotive forces supplied by said two sources of current.

79. The method of regulating the speed of an electric motor which consists in conducting current to the armature of said motor from one source of current, supplying its field jointly from said source of current and another source of current, and varying the electromotive forces supplied by said two sources of current inversely.

80. The method of regulating the speed of an electric motor which consists in supplying the armature of said motor from one source of current, supplying its field jointly from said source of current and another source of current, and varying the electromotive force of said first source of current.

81. A system of motor control, comprising a motor, a generator supplying the armature of the motor, a second generator assisting the first to energize the magnetic field of the motor, and means for varying the field strength of the first generator over a wide range independently of the electromotive force upon said second generator for varying the motor speed.

82. A system of motor control, comprising a motor, a generator supplying the armature of the motor, a second generator assisting the first to energize the magnetic field of the motor, and means for varying the field current supplied from the second generator for varying the motor speed.

83. A system of motor control, comprising a motor, a generator supplying the armature of the motor, a second generator assisting the first to supply the field of the motor, and means for varying the field strength of the first generator over a wide range independently of the electromotive force of said second generator and for varying the effect of the electromotive force of said second generator upon the motor field for varying the speed of the motor.

84. A system of motor control, comprising a generator, a motor the armature of which is supplied by said generator, a second generator assisting the first to supply the field excitation of the motor, and means for varying the field strength of the first generator over a wide range independently of the electromotive force upon said second generator and for varying the field strength of the motor.

85. A system of motor control, comprising a motor, a generator supplying the armature of the motor, a second generator assisting the first to supply the field excitation of the motor, and a unitary means for varying the field strengths of the first generator and the motor.

86. A system of motor control, comprising two generators and a motor, connections whereby the motor armature has applied thereto the current of one of said generators, and the motor field by current from the two generators, and means for varying the electromotive force of one of the generators over a wide range independently of the electromotive force upon the other generator for varying the speed of the motor.

87. A system of motor control, comprising a motor having a main field and an auxiliary field, a generator for supplying the armature of said motor, a separate source for supplying the main field winding of the motor, and means for varying the electromotive force of the generator and the total field strength of the motor.

88. A motor control system, comprising a plurality of motors connected to a common load, a plurality of generators supplying the armatures of said motors, means for supplying an electromotive force to the field windings of the motors and to the field windings of the generators, means for varying the relative current strengths in the motor field windings, and means for varying the relative current strengths in the generator field windings.

89. A motor control system, comprising a plurality of motors connected to a common load, a plurality of generators supplying the armatures of said motors, means for supplying an electromotive force to the field windings of the motors and to the field windings of the generators, means for varying the field strengths of the motors both individually and collectively, and means for varying the field strengths of the generators both individually and collectively.

90. The combination of a supply circuit, an electric motor, two transforming devices each adapted to receive energy from the supply circuit, and deliver substantially equal energy suitably transformed to at least one element of the motor, and means for connecting certain windings of said devices in series and in parallel for controlling the speed of the motor.

91. The combination of a supply circuit, a vehicle, a propelling electric motor therefor, two devices on the vehicle each adapted to receive energy from the supply circuit and deliver substantially equal energy suitably transformed to at least one element of the motor, and means for connecting certain windings of said devices in series and in parallel for the purpose of controlling the speed of the motor.

92. The combination of a plurality of electric energy transforming devices, each of said devices having a winding, a source of current supply for said devices, a control system adapted to vary the electrical connections of said devices relative to each other, and an electric motor having at least one element controlled thereby.

93. The method of controlling a plurality of energy transforming devices each having a winding, which consists in varying the circuit connections of said windings relative to each other, and varying the electromotive force derived from one of said windings independently of the other winding.

94. The combination of a plurality of electric energy controlling devices each adapted to deliver energy of lower electromotive force than the electromotive force of the energy received and each having a winding, means for connecting said windings in different relation for controlling the electromotive force of the energy delivered by said devices, an electric motor, and means for varying the electromotive force of the energy supplied by said devices to the motor for varying the speed of the motor.

95. The combination of an alternating current supply circuit, a plurality of electric energy transforming devices each having a winding connected with said circuit, a plurality of electric motors each having a winding supplied by energy from at least one of said devices, and means for connecting certain windings of said devices in different relation to each other for varying the electromotive force of the energy supplied to the said motor windings and thereby control the speed of the motors.

96. The combination of an alternating current supply circuit, means comprising two windings for deriving therefrom two divisions of electric energy, and means for connecting said windings in different ways to vary the electromotive force of the energy delivered, and a plurality of motors having windings supplied by said energy.

97. The combination of an electric motor, means comprising two windings for supplying energy to said motor, and controlling means for connecting said windings in series and in parallel and for controlling the field strength of the motor.

98. The combination of means comprising two windings for supplying electric energy, and a controller for connecting said two windings in series and in parallel and for varying the electromotive force of the energy supplied by said windings when connected in parallel.

99. The combination of means comprising two windings for supplying electric energy, and a controller for arranging said two windings in different operative relationship relative to each other and for varying the electromotive force of the energy supplied by said two windings.

100. The combination of means comprising two windings for supplying electric energy, and a controller for arranging said two windings in different ways while operating jointly in supplying electric energy and for varying the electromotive force of the energy supplied by said windings when connected in the said different ways.

101. The combination of an electric motor, means comprising two windings for supplying electromotive force to the motor, and a controller adapted to control the electromotive force supplied by said windings and affecting one element of the motor and to also control the other element of the motor.

102. The method of motor control, which consists in supplying to a motor winding energy from two windings while the said two windings are in parallel with each other under conditions demanding maximum torque and in supplying to the motor winding energy from the said two windings while they are in series with each other under conditions demanding maximum electromotive force whereby the size, weight and cost of the energy delivering windings are reduced.

103. The method of varying the speed of an electric motor, which consists in connecting in series and in parallel two electromotive force producing windings which are in circuit with the motor counter-electromotive force winding, and varying the electromotive forces of said two windings relatively to each other.

104. The method of varying the duty of an electromotive force producing winding, which consists in connecting in series and in parallel therewith a second electromotive force producing winding, and varying the electromotive force of said second winding relatively to the first while connected in series and in parallel.

105. The method of varying the joint electromotive force and current of two electromotive force producing windings, which consists in connecting said windings in series and in parallel with each other, varying their electromotive forces simultaneously, and also varying the electromotive force of at least one of said windings independently while connected in series and in parallel.

106. The combination of a source of electric energy, energy transforming means comprising two windings, an electric motor having two elemental windings, a controller for connecting one of said transformer windings with one of said motor windings and disconnecting it therefrom and for varying the effective electromotive force in the circuit containing said windings, and for controlling the current in the other motor winding.

107. A source of electric energy of constant electromotive force, a motor generator having the armature of the motor supplied with energy from said source, a working motor having its armature connected in series with the generator armature of the motor generator, separately excited field windings for the said generator and the working motor respectively, and a controller for varying the effective electromotive force impressed upon said armature circuit and for causing said generator armature to be connected with said motor armature and disconnected therefrom.

108. A source of electric energy of constant electromotive force, a motor generator having the armature of the motor supplied with energy from said source, a working motor having its armature connected in series with the generator armature of the motor generator, separately excited field windings for the said generator and the working motor respectively, and a controller for varying the effective electromotive force impressed upon said armature circuit, for causing said generator armature to be connected with said motor armature and disconnected therefrom and for varying the field strength of the working motor.

109. A source of electric energy of constant electromotive force, a motor generator having the armature of the motor supplied with energy from said source, a working motor having its armature connected in series with the generator armature of the motor generator, separately excited field windings for the field of the generator and the working motor respectively, and a controller for varying the effective electromotive force impressed upon said armature circuit and for varying the current in the field winding of the working motor.

110. The combination of a source of supply having a variable electromotive force, an electric motor having a separately excited field winding, and a controller for causing the armature of the motor to be connected with and disconnected from said source, for varying the electromotive force of said source for varying the speed of the motor, and for varying the current in said separately excited field winding for still further varying the speed of the motor.

111. The combination of a generator, a motor, each having a separately excited field winding, and a controller for effecting the connection of the generator and motor armatures in a local circuit, for varying the electromotive force impressed upon said circuit by varying the current in the generator field winding and thereby varying the speed of the motor, and for still further varying the speed of the motor by varying the current in said motor field winding.

112. The combination of a dynamo electric source of electromotive force, an electric motor, and a controller for effecting the connection of the motor armature to said source, for varying the dynamically generated electromotive force of said source for varying the speed of the motor, and for further varying the speed of the motor independently of any variation of said electromotive force.

113. The combination of a dynamo electric source of electromotive force, an electric motor, and a drum type controller for effecting the connection of the motor armature to said source, for varying the dynamically generated electromotive force of said source for varying the speed of the motor, and for further varying the speed of the motor independently of any variation of said electromotive force.

114. The combination of a source of variable electromotive force, an electric motor, and a drum type controller for varying the electromotive force derived from said source and impressed upon the motor armature circuit for varying the speed of the motor, and for further varying the speed of the motor independently of any variation of said electromotive force.

115. The combination of a source of alternating current, energy transforming means supplied therefrom and adapted to supply different voltages, and a motor having its armature and a field winding supplied in series with energy from said means, said motor having an additional field winding excited independently of its armature current.

116. The combination of a plurality of separately excited generators having their armatures connected in series with each other, an electric motor, the armature of said motor being connected in series with the armatures of said generators, and means under the control of the operator of the motor for varying the joint voltage of said generators for varying the speed of the motor.

117. The combination of a plurality of generators having their armatures connected in series with each other, each of said generators having a separately excited field winding, and a plurality of electric motors acting upon a common load, the armatures of said motors being supplied with energy from the armatures of said generators.

118. The combination of a source of alternating current energy, means for deriving therefrom two divisional sources of direct current energy in series with each other, an electric motor having its armature connected with said two divisional sources, and means for varying the electromotive force generated and supplied to said motor armature for varying its speed.

119. The combination of a source of alternating current energy, means for deriving therefrom two divisional sources of direct current energy, a plurality of electric motors acting upon a common load and having their armatures connected with said divisional sources, and means for varying the electromotive force generated and supplied to the motor armatures for varying their speed.

120. The combination of a source of alternating current energy, means for deriving therefrom two divisional sources of direct current energy, a plurality of electric motors acting upon a common load and having their armatures connected with said divisional sources, and means for varying and reversing the voltage generated and supplied to the motor armatures for varying their speed and reversing their direction of rotation.

121. The method of controlling electric energy which consists in generating electric energy in a plurality of windings in series with each other, supplying the energy to a plurality of electric motor windings acting upon a common load, and varying and reversing the electromotive force of said windings for varying the speed and reversing the direction of rotation of the motors.

122. The combination of a source of alternating current energy, means for transforming said energy to energy of lower electromotive force, an electric motor supplied with such transformed energy and having a plurality of field windings, one of said field windings being energized by a current responsive to changes in the motor armature current and another of said windings being energized by a current independent of changes in the motor armature current.

123. The combination of a source of alternating current energy, a vehicle, means on the vehicle for transforming the energy of said source, a motor supplied with such transformed energy, said motor having a plurality of field windings, one of said windings being energized by a current responsive to changes in the motor armature current and another of said windings being energized by a current independent of changes in the motor armature current.

124. The method of varying the electromotive force and current of two electromotive force producing windings, which consists in connecting said windings in series, varying the electromotive force of at least one of said windings independently while connected in series, and varying the electromotive force of the two windings simultaneously while they are each supplying current which is effective jointly.

125. The method of operating a plurality of motors acting upon a common load, which consists in supplying to the motors energy from a plurality of electromotive force producing windings, varying the electromotive force of one or both of the windings, and varying the circuit connections of the windings for causing both windings to supply energy to the common load and thereby varying the torque and speed effective upon the common load.

126. The combination of a plurality of electric motors, a plurality of transformer windings adapted to receive alternating current energy and supply current to said motors, and means for arranging certain of said windings in a plurality of different ways to supply electric energy to said motors.

127. The combination of a plurality of electric motors acting upon a common load, means comprising two windings for supplying energy to said motors, and controlling means for varying the circuit connections of said windings relative to each other and for controlling the field strength of the motors.

128. The combination of a plurality of electric motors, a plurality of transformer windings adapted to receive alternating current energy and supply current to said motors, and means for varying the connection of said windings with reference to said motors.

129. The combination of a plurality of sources of magnetically induced electromotive force, means for varying the electromotive force of at least one of said sources independently of that of the other, a plurality of motor windings acting jointly upon a common load, and a controller adapted to render effective the aggregate current capacity of said sources when maximum torque is desired in the motor windings and to render effective the aggregate voltage capacity of said sources when the maximum speed of the motors is desired.

This specification signed and witnessed this 16th day of January 1903.

H. WARD LEONARD.

Witnesses:
BESSIE DEVINE,
KATE HYLAND.

---

It is hereby certified that in Letters Patent No. 979,078, granted December 20, 1910, upon the application of Harry Ward Leonard, of Bronxville, New York, for an improvement in "Electric-Motor Control" an error appears in the printed specification requiring correction as follows: Page 1, line 87, the period after the word "load" should be stricken out and the following word "When" should commence with a small *w* thus making a continuous sentence; and that the said Letters Patent should be read with this correction therein that the same may conform to the record of the case in the Patent Office.

Signed and sealed this 31st day of January, A. D., 1911.

[SEAL.]

C. C. BILLINGS,